(12) United States Patent
Kummer et al.

(10) Patent No.: US 9,783,291 B2
(45) Date of Patent: Oct. 10, 2017

(54) HYBRID AXIAL/CROSS-FLOW FAN MULTI-ROTOR AERIAL VEHICLE

(71) Applicant: Propulsive Wing, LLC, Elbridge, NY (US)

(72) Inventors: Joseph Kummer, Fayetteville, NY (US); Jimmie B. Allred, III, Skaneateles, NY (US)

(73) Assignee: PROPULSIVE WING, LLC, Elbridge, NY (US)

( * ) Notice: Subject to any disclaimer, the term of this patent is extended or adjusted under 35 U.S.C. 154(b) by 227 days.

(21) Appl. No.: 14/689,443

(22) Filed: Apr. 17, 2015

(65) Prior Publication Data

US 2016/0009387 A1   Jan. 14, 2016

Related U.S. Application Data

(60) Provisional application No. 61/981,414, filed on Apr. 18, 2014.

(51) Int. Cl.
| | |
|---|---|
| *B64C 17/00* | (2006.01) |
| *B64C 29/00* | (2006.01) |
| *B64C 39/02* | (2006.01) |
| *B64C 39/10* | (2006.01) |

(52) U.S. Cl.
CPC ...... *B64C 29/0025* (2013.01); *B64C 29/0066* (2013.01); *B64C 29/0083* (2013.01); *B64C 39/024* (2013.01); *B64C 39/10* (2013.01); *B64C 2201/028* (2013.01); *B64C 2201/104* (2013.01); *B64C 2201/108* (2013.01); *B64C 2201/162* (2013.01); *Y02T 50/12* (2013.01)

(58) Field of Classification Search
CPC ............ B64C 29/0025; B64C 29/0066; B64C 29/0083; B64C 39/024; B64C 2201/162; B64C 2201/028; B64C 2201/104; B64C 2201/108; B64C 39/10
USPC .................................................... 244/6, 23 B
See application file for complete search history.

(56) References Cited

U.S. PATENT DOCUMENTS

| | | | |
|---|---|---|---|
| 2,529,033 A | 11/1950 | Linville | |
| 2,540,404 A | 2/1951 | Neale | |
| 2,623,711 A | 12/1952 | Pullin et al. | |
| 2,646,130 A | 7/1953 | Udelman | |
| D190,534 S * | 6/1961 | Smolinski | .................... D12/330 |
| 6,016,992 A | 1/2000 | Kolacny | |
| 6,527,229 B1 | 3/2003 | Peebles | |
| 7,032,861 B2 * | 4/2006 | Sanders, Jr. | ............ B64C 27/12 244/12.1 |

(Continued)

OTHER PUBLICATIONS

Schmidt, "Simulation and Control of a Quadrotor Unmanned Aerial Vehicle", 2011.*

(Continued)

*Primary Examiner* — Assres H Woldemaryam
(74) *Attorney, Agent, or Firm* — Brown & Michaels, PC (57) ABSTRACT

A hybrid axial/cross-flow fan aerial vehicle includes both axial and cross-flow fan propulsion for efficient hover and forward flight performance. The axial fans provide primarily vertical thrust, while the cross-flow fan provides horizontal, as well as vertical, thrust. The vehicle takes off vertically, is capable of hover, and can fly forward by vectoring the thrust of the cross-flow fan system. This approach provides large internal cargo capacity and high forward flight speeds.

11 Claims, 6 Drawing Sheets

(56) References Cited

U.S. PATENT DOCUMENTS

| | | | |
|---|---|---|---|
| 7,641,144 B2 | 1/2010 | Kummer et al. | |
| 8,181,903 B2 * | 5/2012 | Posva | B64C 15/14 244/12.3 |
| 8,561,935 B2 * | 10/2013 | Milde, Jr. | B64C 21/04 244/207 |
| 8,579,573 B2 | 11/2013 | Kolacny | |
| 8,596,570 B1 * | 12/2013 | Carambat | B64C 11/006 244/12.1 |
| D710,452 S | 8/2014 | Barajas et al. | |
| D740,201 S * | 10/2015 | Wang | D12/326 |
| 9,387,929 B2 * | 7/2016 | Gaillimore | B64C 29/0066 |
| 2003/0057331 A1 * | 3/2003 | Kinkead | G05D 1/102 244/194 |
| 2006/0192046 A1 * | 8/2006 | Heath | B64C 15/14 244/12.3 |
| 2006/0266882 A1 * | 11/2006 | Kummer | B64C 3/141 244/55 |
| 2007/0057113 A1 * | 3/2007 | Parks | B64C 15/00 244/12.5 |
| 2007/0215748 A1 * | 9/2007 | Robbins | B64C 39/068 244/12.5 |
| 2007/0246601 A1 * | 10/2007 | Layton | B64C 29/0025 244/12.2 |
| 2008/0169375 A1 * | 7/2008 | Ishikawa | B64C 29/0025 244/12.1 |
| 2012/0111994 A1 * | 5/2012 | Kummer | B63G 8/18 244/15 |
| 2012/0280091 A1 * | 11/2012 | Saiz | B64C 27/26 244/7 R |
| 2013/0140404 A1 * | 6/2013 | Parks | G05D 1/102 244/23 A |
| 2014/0032034 A1 | 1/2014 | Raptopoulos et al. | |
| 2014/0048657 A1 | 2/2014 | Lin | |
| 2014/0339354 A1 * | 11/2014 | Gaillimore | B64C 39/12 244/12.4 |

OTHER PUBLICATIONS

Jones, "Integration of Twenty-Bladed Cross-Flow Fan Into Vertical Take-Off and Landing Aircraft", 2013.*

* cited by examiner

HYBRID AXIAL/CROSS-FLOW FAN MULTI-ROTOR AERIAL VEHICLE

REFERENCE TO RELATED APPLICATIONS

This application claims one or more inventions which were disclosed in Provisional Application No. 61/981,414, entitled "HYBRID AXIAL/CROSS-FLOW FAN MULTI-ROTOR AERIAL VEHICLE", filed Apr. 18, 2014. The benefit under 35 USC §119(e) of the United States provisional application is hereby claimed, and the aforementioned application is hereby incorporated herein by reference.

BACKGROUND OF THE INVENTION

Field of the Invention

This invention relates to unmanned aerial vehicles (UAVs), and in particular to multi-rotor UAVs.

Description of Related Art

Substantial prior art exists for multi-rotor helicopter designs. U.S. Pat. No. 2,529,033 (Linville), issued Nov. 7, 1950, U.S. Pat. No. 2,540,404 (John), issued Feb. 6, 1951, U.S. Pat. No. 2,623,711 (Pullen), issued Dec. 30, 1952, U.S. Pat. No. 2,646,130 (Udelman), issued Jul. 21, 1953, U.S. Patent Publication No. 2014/0032034 (Raptopoulos), published Jan. 30, 2014, and U.S. Design Pat. No. D710,452 (Barajas), issued Aug. 5, 2014, are just a few of the numerous U.S. patent that disclose various iterations on the multi-rotor theme.

In addition, multiple cross-flow fan propelled aircraft designs have been disclosed in U.S. Pat. No. 6,016,992 (Kolacny), issued Jan. 25, 2000, U.S. Pat. No. 6,527,229 (Peebles), issued Mar. 4, 2003, U.S. Pat. No. 7,641,144 (Kummer), issued Jan. 5, 2010, U.S. Pat. No. 8,579,573 (Kolacny), issued Nov. 12, 2013, and U.S. Patent Publication Nos. 2012/0111994 (Kummer), published May 10, 2012 and 2014/0048657 (Lin), published Feb. 20, 2014.

The prior art does not disclose hybrid multi-rotor helicopters utilizing a combination of axial fans for vertical thrust (i.e. hover capability) and one or more cross-flow fans for horizontal thrust (i.e. forward flight). As a result, prior art vehicles have limited forward flight speed and internal cargo volume.

SUMMARY OF THE INVENTION

A combined propulsion system includes both axial and cross-flow fans (CFF). This hybrid propulsion approach merges two technologies in a way that provides efficient hovering capability, ample internal cargo capacity, and high forward flight speeds.

In one embodiment, a hybrid axial/cross-flow fan multi-rotor aerial vehicle includes an airfoil shaped wing body having a center of mass and a trailing edge, at least three axial fans spaced around the center of mass of the wing body, and at least one cross-flow fan propulsor embedded within the trailing edge of the wing body.

In another embodiment, a hybrid axial/cross-flow fan multi-rotor aerial vehicle includes an airfoil shaped wing body having a center of mass and a trailing edge, at least six axial fans spaced around the center of mass of the wing body, and at least one cross-flow fan propulsor embedded within the trailing edge of the wing body. In this embodiment, half of the axial fans rotate in the clockwise direction and half of the axial fans rotate in the counter-clockwise direction.

DETAILED DESCRIPTION OF THE INVENTION

Recently there has been a rapid development of quadcopter and other multi-rotor unmanned aerial vehicles (UAVs) capable of stable hovering and easy flight control. There are two significant challenges, however, that remain with these configurations: payload volume and forward flight speed.

With all of the rotors spaced symmetrically about the center of the vehicle, quadcopters and other multi-rotor vehicles offer an excellent stable platform for hovering. Unfortunately, as with most vertical takeoff and landing (VTOL) vehicles that rely solely on vertical thrust to maintain flight, speed in forward flight is often limited, since the thrust vector must be angled to create forward thrust. In contrast, typical fixed wing aircraft produce thrust by creating a pressure difference between the bottom and top wing surfaces while in forward flight, which is significantly more efficient (i.e. it allows for higher speeds with lower power consumption). In addition, since multi-rotor helicopters typically do not rely on a wing shape to create lift, they lack an aerodynamic lifting body as a fuselage. As a result, payload must either be carried externally, or else contained within a pod or other external body which does not create lift in forward flight, but significantly increases the drag, thus further reducing maximum forward flight speed.

The vehicles and systems disclosed herein address the deficiencies of limited forward flight speed and internal cargo volume in the current state-of-the-art of multirotor aerial vehicle technology through a combined propulsion system including both axial and cross-flow fans (CFF). This hybrid propulsion approach merges two technologies in a way that provides efficient hovering capability, but also ample internal cargo capacity and high forward flight speeds.

Figure 1:
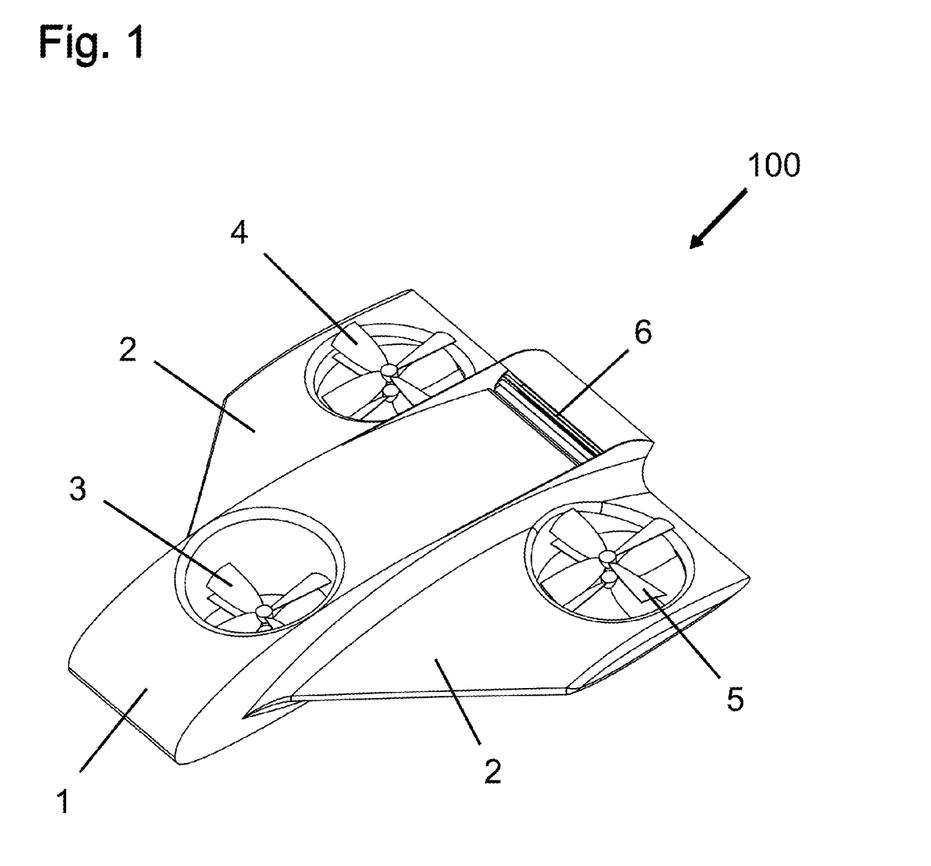
FIG. 1 shows a multi-rotor vehicle with six axial fans and one cross-flow fan in an embodiment of the present invention.
Figure 2:
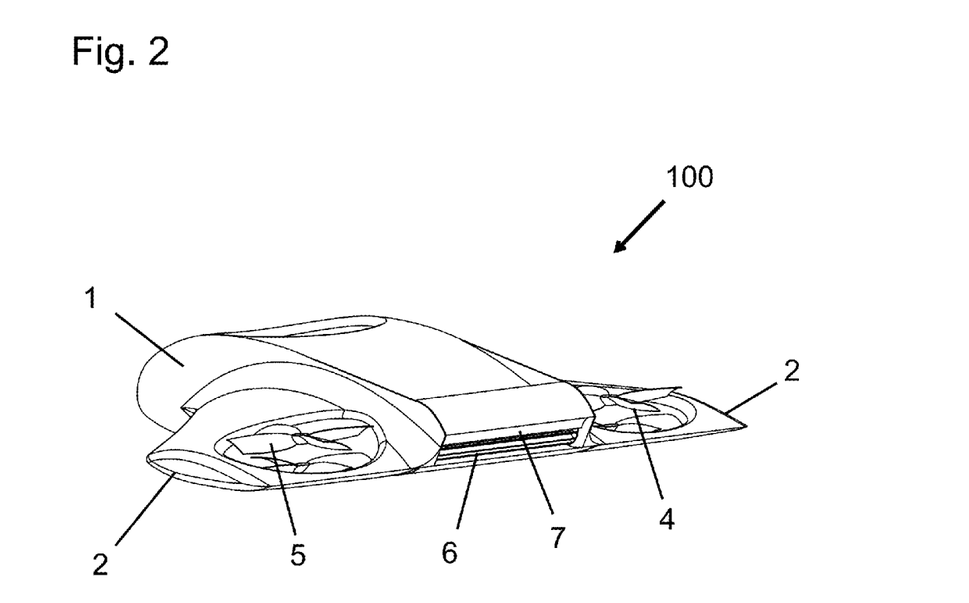
FIG. 2 shows an alternate view of the multi-rotor vehicle shown in FIG. 1.
Figure 3:
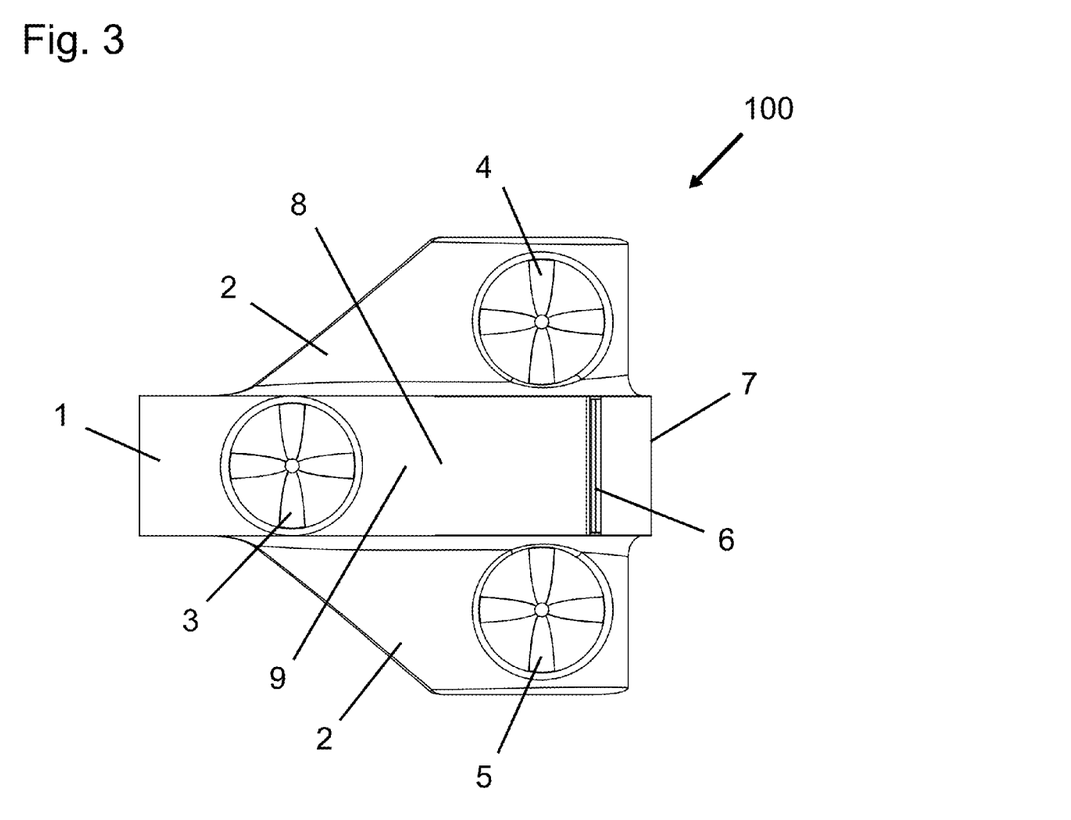
FIG. 3 shows a top view of the multi-rotor vehicle shown in FIG. 1.

FIGS. 1-3 show a hybrid axial/CFF multi-rotor vehicle 100. Axial fans 3, 4, and 5 are located forward and to the sides of the center 9 of the vehicle, and one or more cross-flow fans 6 are located at the rear, or trailing edge 7. The six axial fans are spaced in sets 3, 4, 5 of two around the center of mass 9 of the wing body. The axial fans 3, 4, 5 provide vertical thrust for hovering, while the trailing edge mounted CFF propulsion 6 provides horizontal thrust for forward flight, as well as the potential for additional vertical thrust via thrust deflection at the trailing edge 7. In this case the thrust is vectored downward for vertical thrust (hover configuration), but is directed horizontally or close to horizontally for forward flight.

The configuration of the six axial fans within the vehicle is in groups 3, 4, 5 of two counter-rotating rotors. One rotor rotates clockwise, while the other rotor rotates counter-clockwise, thus balancing out the yawing torque produced. The particular axial fan configuration 100 shown in FIGS. 1-3 is called a Y6, best seen in FIG. 3. Basic hover controls are afforded through differential thrust (for roll and pitch) and differential torque via rpm modifications (for yaw).

Once the vehicle 100 is airborne, however, instead of the conventional means of helicopter forward flight whereby the thrust is tilted forward, the method and devices herein utilize a trailing edge mounted cross flow fan-propulsor including at least one cross-flow fan 6 to produce horizontal thrust. As forward speed increases, the vertical lift fans 3, 4, 5 operate at reduced power. In full forward flight mode, only a small portion of the vertical lift component comes from the axial fans 3, 4, 5. Instead the lift comes from the pressure differential produced on the aerodynamic centerbody 1 and outboard wings 2. The axial fans 3, 4, 5 provide only enough differential thrust for continued roll and pitch control.

Outboard wings 2 are used for efficient forward flight, with the side axial fans 4, 5 located within them. In hover, the vehicle behaves similarly to other multi-rotor UAVs. In forward flight, however, the streamlined airfoil shaped wing body and outboard wings provide much higher lift to drag ratio, and the ability of the cross-flow fan ducting to vector the thrust horizontally provides more efficient thrust in forward flight, and also additional vertical lift in hover if required. As noted in FIG. 3, the large payload space 8 within the centerbody 1 provides ample space and proper center-of-gravity location for payload.

Figure 4:
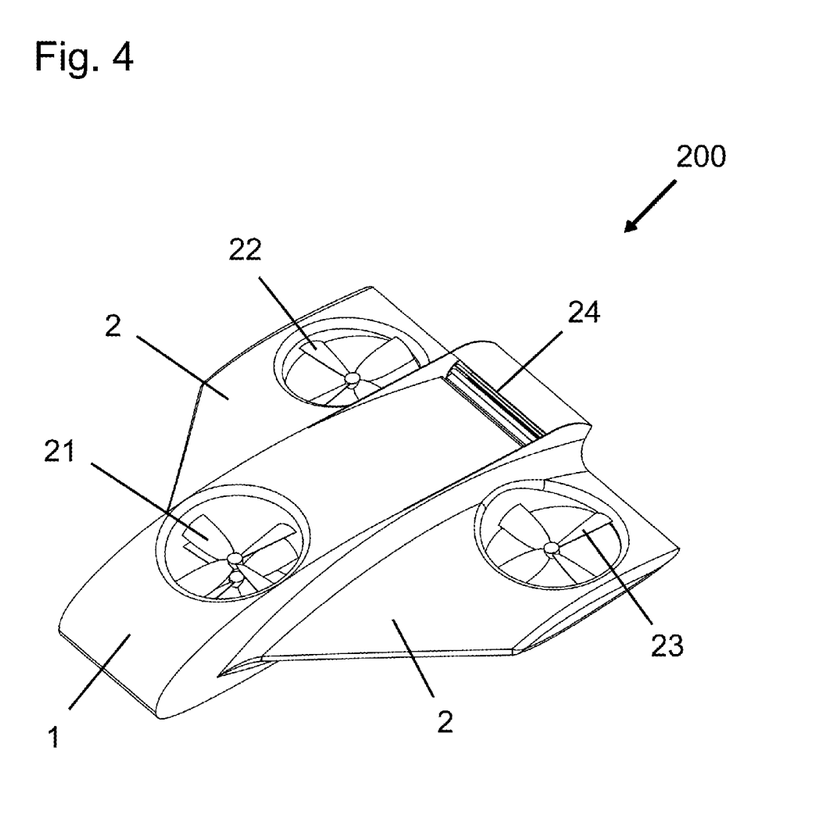
FIG. 4 shows a multi-rotor vehicle with four axial fans and one cross-flow fan in another embodiment of the present invention.

FIG. 4 shows a hybrid axial/CFF multi-rotor vehicle 200 in an alternative embodiment of the present invention with one axial fan group 21, two individual axial fans 22, 23, and one cross-flow fan 24. In the axial fan group 21, which includes two axial fans, one rotor rotates clockwise, while the other rotor rotates counter-clockwise, thus balancing out the yawing torque produced. Although not shown, in other embodiments, the hybrid axial/CFF multi-rotor vehicle may include two axial fan groups and one individual axial fan, for a total of five axial fans. Other numbers and combinations of axial fans are also possible.

Figure 5:
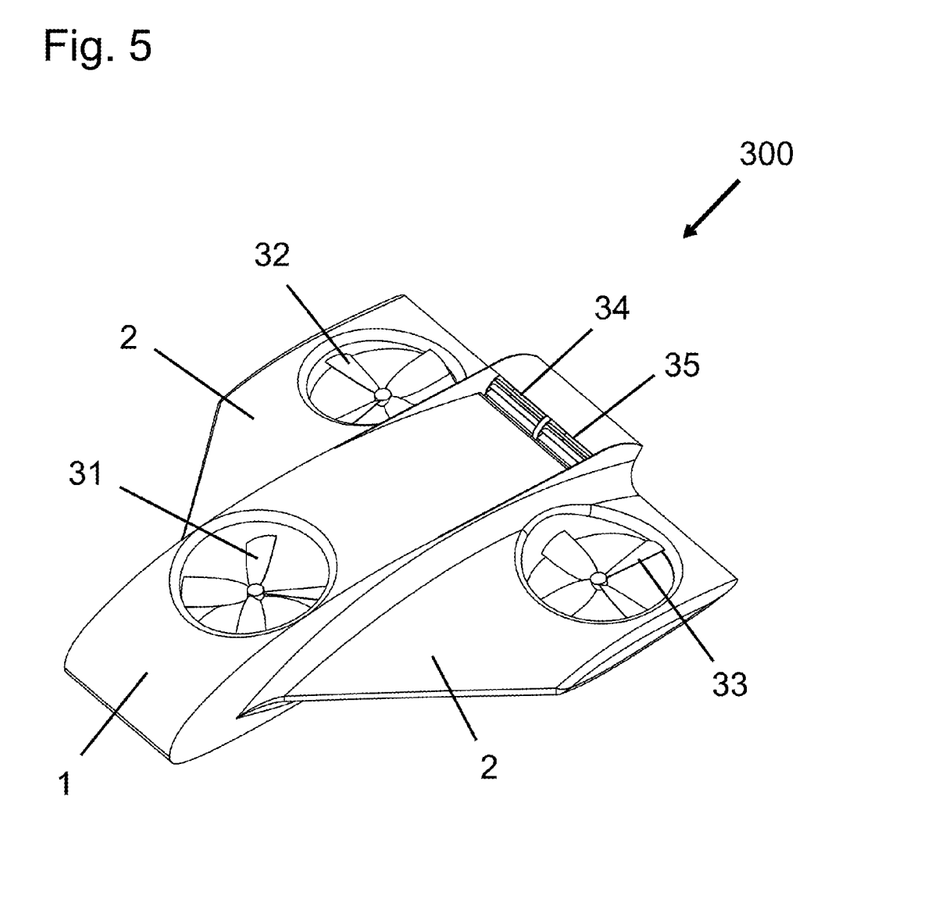
FIG. 5 shows a multi-rotor vehicle with three axial fans and two cross-flow fans in another embodiment of the present invention.

FIG. 5 shows a hybrid axial/CFF multi-rotor vehicle 300 in an alternative embodiment of the present invention. In this embodiment, the vehicle includes three individual axial fans 31, 32, 33 and two cross-flow fans 34, 35. The cross-flow fans 34, 35 preferably share the same motor. Additional cross-flow fans may be included in other embodiments.

In some embodiments of FIGS. 1-5, both the axial fans and the cross-flow fan propulsor produce vertical thrust. In other embodiments, the axial fans only produce vertical thrust and the cross-flow fan propulsor produces only horizontal thrust.

In forward flight, the cross-flow fan propulsor produces horizontal thrust and the axial fans provide roll, pitch, and yaw control through differential rotor speed. The vehicle also preferably includes a control system allowing transition from hover to forward flight by increasing power transmitted to the cross-flow fan propulsor and decreasing power transmitted to the axial fans.

Figure 6:
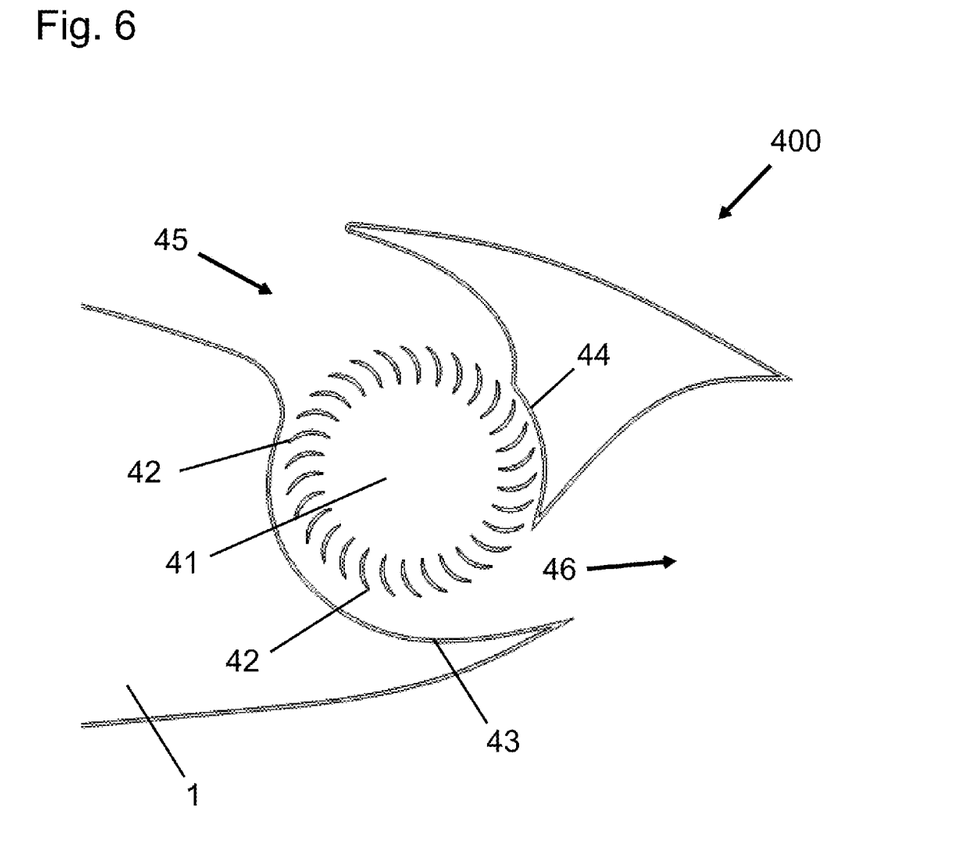
FIG. 6 shows an example of a cross-flow fan that may be used in the vehicles described herein.

In preferred embodiments, the cross-flow fan propulsor includes at least one cross-flow fan at least partially embedded into the airfoil shaped wing body, a motor, a rotor including a plurality of fan blades, and a cover or housing surrounding the rotor and having an inlet and an outlet. FIG. 6 shows a cross-section of a cross-flow fan propulsor 400 with a cross-flow fan 41 and housing. The cross-flow fan 41 is embedded within the airfoil shaped wing body 1. The cross-flow fan 41 has fourteen or more individual fan blades 42, a lower housing wall 43, and an upper housing wall 44. Air flows radially into the cross-flow fan 41 at the inlet 45 and exhausts at the outlet 46.

All above-mentioned references are hereby incorporated by reference herein.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hybrid axial/cross-flow fan multi-rotor aerial vehicle comprising:
   an airfoil shaped wing body having a center of mass, a payload space located at the center of mass of the airfoil shaped wing body and a trailing edge;
   at least three axial fans spaced around the center of mass of the wing body;
   at least one cross-flow fan propulsor located behind the center of mass and the axial fans and embedded within the trailing edge of the wing body; and
   a control system allowing transition from hover to forward flight by increasing power transmitted to the cross-flow fan propulsor and decreasing power transmitted to the axial fans;
   wherein the axial fans only produce vertical thrust and the cross-flow fan propulsor produces only horizontal thrust.

2. The aerial vehicle of claim 1, wherein the cross-flow fan propulsor comprises a lower housing wall, an upper housing wall, and at least one cross-flow fan at least partially embedded into the airfoil shaped wing body and comprising at least fourteen fan blades.

3. A hybrid axial/cross-flow fan multi-rotor aerial vehicle comprising:
   an airfoil shaped wing body having a center of mass, a payload space located at the center of mass of the airfoil shaped wing body and a trailing edge; and
   at least six axial fans spaced around the center of mass of the wing body;
   at least one cross-flow fan propulsor located behind the center of mass and the axial fans and embedded within the trailing edge of the wing body; and
   a control system allowing transition from hover to forward flight by increasing power transmitted to the cross-flow fan propulsor and decreasing power transmitted to the axial fans;
   wherein half of the axial fans rotate in the clockwise direction and half of the axial fans rotate in the counter-clockwise direction;
   wherein the axial fans only produce vertical thrust and the cross-flow fan propulsor produces only horizontal thrust.

4. The aerial vehicle of claim 3, wherein the cross-flow fan propulsor comprises a lower housing wall, an upper housing wall, and at least one cross-flow fan at least partially embedded into the airfoil shaped wing body and comprising at least fourteen fan blades.

5. A hybrid axial/cross-flow fan multi-rotor aerial vehicle comprising:
   an airfoil shaped wing body having a center of mass, a payload space located at the center of mass of the airfoil shaped wing body and a trailing edge;

at least three axial fans spaced around the center of mass of the wing body;

at least one cross-flow fan propulsor located behind the center of mass and the axial fans and embedded within the trailing edge of the wing body; and a control system allowing transition from hover to forward flight by increasing power transmitted to the cross-flow fan propulsor and decreasing power transmitted to the axial fans;

wherein, in forward flight, the cross-flow fan propulsor produces horizontal thrust and the axial fans provide roll, pitch, and yaw control through differential rotor speed.

6. The aerial vehicle of claim 5, wherein the cross-flow fan propulsor comprises a lower housing wall, an upper housing wall, and at least one cross-flow fan at least partially embedded into the airfoil shaped wing body and comprising at least fourteen fan blades.

7. A hybrid axial/cross-flow fan multi-rotor aerial vehicle comprising:

an airfoil shaped wing body having a center of mass, a payload space located at the center of mass of the airfoil shaped wing body and a trailing edge; and at least six axial fans spaced around the center of mass of the wing body;

at least one cross-flow fan propulsor located behind the center of mass and the axial fans and embedded within the trailing edge of the wing body; and a control system allowing transition from hover to forward flight by increasing power transmitted to the cross-flow fan propulsor and decreasing power transmitted to the axial fans;

wherein half of the axial fans rotate in the clockwise direction and half of the axial fans rotate in the counter-clockwise direction;

wherein, in forward flight, the cross-flow fan propulsor produces horizontal thrust and the axial fans provide roll, pitch, and yaw control through differential rotor speed.

8. The aerial vehicle of claim 7, wherein the cross-flow fan propulsor comprises a lower housing wall, an upper housing wall, and at least one cross-flow fan at least partially embedded into the airfoil shaped wing body and comprising at least fourteen fan blades.

9. A hybrid axial/cross-flow fan multi-rotor aerial vehicle comprising:

an airfoil shaped wing body having a center of mass, a payload space located at the center of mass of the airfoil shaped wing body and a trailing edge;

at least three axial fans spaced around the center of mass of the wing body;

at least one cross-flow fan propulsor located behind the center of mass and the axial fans and embedded within the trailing edge of the wing body; and a control system allowing transition from hover to forward flight by increasing power transmitted to the cross-flow fan propulsor and decreasing power transmitted to the axial fans;

wherein the axial fans produce primarily vertical thrust and the cross-flow fan propulsor produces primarily horizontal thrust.

10. The aerial vehicle of claim 9, comprising at least six axial fans spaced around the center of mass of the wing body; wherein half of the axial fans rotate in the clockwise direction and half of the axial fans rotate in the counter-clockwise direction.

11. The aerial vehicle of claim 10, wherein the cross-flow fan propulsor comprises a lower housing wall, an upper housing wall, and at least one cross-flow fan at least partially embedded into the airfoil shaped wing body and comprising at least fourteen fan blades.

* * * * *